United States Patent
Burress

(10) Patent No.: US 10,549,589 B1
(45) Date of Patent: Feb. 4, 2020

(54) TRAILER THEFT DETERRENT DEVICE AND METHOD

(71) Applicant: Dale E Burress, Corryton, TN (US)

(72) Inventor: Dale E Burress, Corryton, TN (US)

( * ) Notice: Subject to any disclaimer, the term of this patent is extended or adjusted under 35 U.S.C. 154(b) by 0 days.

(21) Appl. No.: 14/945,579

(22) Filed: Nov. 19, 2015

Related U.S. Application Data

(60) Provisional application No. 62/123,510, filed on Nov. 20, 2014.

(51) Int. Cl.
*B60D 1/28* (2006.01)
*B60D 1/06* (2006.01)

(52) U.S. Cl.
CPC .............. *B60D 1/28* (2013.01); *B60D 1/065* (2013.01)

(58) Field of Classification Search
CPC .................................. B60D 1/28; B60D 1/065
USPC ......................................................... 280/507
See application file for complete search history.

(56) References Cited

U.S. PATENT DOCUMENTS

| | | | | |
|---|---|---|---|---|
| 3,233,913 A * | 2/1966 | Brown | ..................... | B60D 1/28 280/480 |
| 3,307,857 A * | 3/1967 | Robertson | ................ | B60D 1/06 24/694 |
| 3,492,023 A * | 1/1970 | Thompson | ............. | B60D 1/065 280/507 |
| 3,797,283 A * | 3/1974 | Honer | ..................... | B60D 1/60 52/143 |
| 3,857,575 A * | 12/1974 | Lee | .......................... | B60D 1/66 248/351 |
| 5,222,755 A * | 6/1993 | O'Neal | ..................... | B60D 1/60 280/507 |
| 5,743,549 A * | 4/1998 | Jackson | ................ | B60D 1/065 280/507 |
| 6,419,258 B1 * | 7/2002 | Grote | ....................... | B60D 1/06 280/507 |
| 7,699,336 B2 * | 4/2010 | Van Laere | ............... | B60D 1/60 280/507 |

* cited by examiner

*Primary Examiner* — Joseph M Rocca
*Assistant Examiner* — Felicia L. Brittman
(74) *Attorney, Agent, or Firm* — Jonathan Rigdon Smith, J.D., PC; Jonathan Rigdon Smith

(57) ABSTRACT

A substantially spherical ball made of tough plastic fits in the coupler cavity of a trailer and is secured to the trailer safety chain by a zip tie, cord or cable. It is locked in place by a padlock through the lever on the coupler ball hitch. Thus it prevents a potential thief from quickly temporarily hitching the trailer to his/her hitch ball.

8 Claims, 3 Drawing Sheets

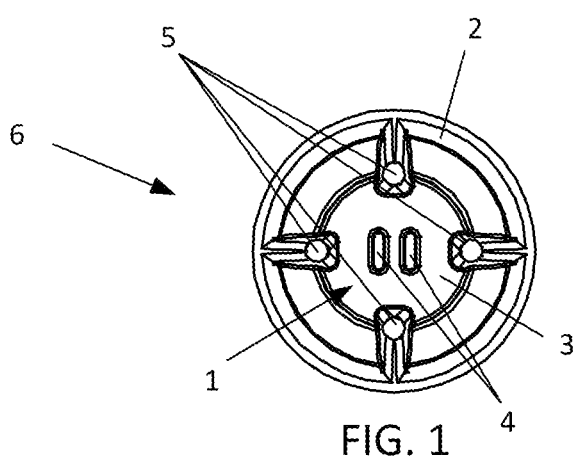
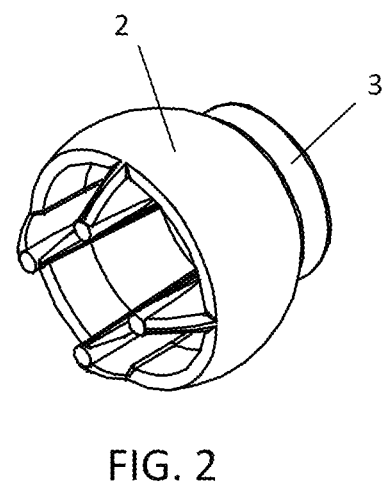
FIG. 1   FIG. 2
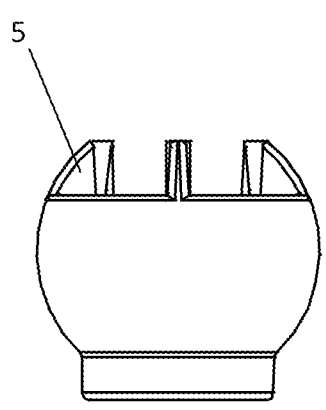
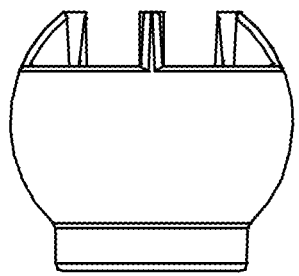
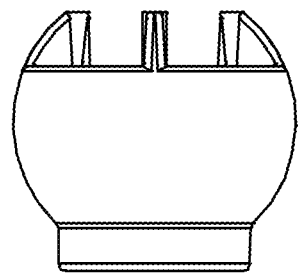
FIG. 3   FIG. 4   FIG. 5
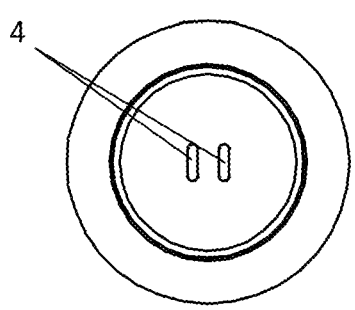
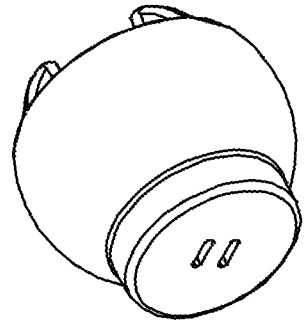
FIG. 6   FIG. 7

TRAILER THEFT DETERRENT DEVICE AND METHOD

CROSS-REFERENCES TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

REFERENCE TO A BIOLOGICAL SEQUENCE LISTING

Not applicable.

BACKGROUND OF INVENTION

Field of the Invention

This invention is in the field of theft deterrence, more specifically in the field of deterrence of vehicle trailer theft, and still more specifically in the field of deterrence of theft of ball hitch trailers.

Description of the Related Art

A trailer ball hitch is a common means of hitching a trailer to a vehicle, comprising an upward-facing spherical hitch ball affixed to a frame on the rear of a towing vehicle, over which a downward-facing substantially spherical hitch cavity or coupler on the front of a trailer is placed. The coupler is typically equipped with a spring-loaded latch that engages a portion of the underside of the ball when the coupler is placed on the ball, and the latch may be retracted by a hand lever to enable the coupler to be lifted off the ball.

As a general practice, trailers are not attached to vehicles most of the time because the vehicles are used for purposes other than towing. Thus, the trailers are commonly left parked with the coupler exposed. This is an invitation for someone with a towing vehicle to back up to the trailer and steal it. Such theft is deterred by locking the lever down or otherwise preventing access to the coupler. Potential thieves are deterred by any device, even a simple padlock, that requires time (and generates noise) to remove. There are many other devices on the market that take longer to remove, such as for example the Megahitch® lock by Clearwater Industries of Eugene, Oreg., U.S.A. This is a nearly indestructible box with an internal ball that fits the coupler. The box surrounds the entire coupler and is locked in place. The lock has no external parts, but it can still be picked. Other coupler locks on the market are either more expensive or less secure, but they all can be removed given sufficient time and the proper tools. They also have the disadvantage of having to be stored when not in use, where they may be misplaced unless they are stored somewhere on the trailer. If they are stored on the trailer, they may be damaged or get in the way. For these reasons, many trailer owners consider it a waste of money to invest in more than a padlock.

Nevertheless, a trailer coupler that is secured only with a padlock through the lever is still vulnerable to quick theft, because there is a part of the coupler cavity that extends below the latch which can be placed temporarily on top of the hitch ball of a towing vehicle. This enables the trailer to be towed slowly to a place where the lock can be cut off. There is thus a need for a means to remove this possibility.

BRIEF DESCRIPTION OF THE INVENTION

Objects of the Invention

The principal object of this invention is to provide a simple and inexpensive trailer theft deterrent device that works with a padlock. Another object of the invention is to provide such a device that is more accessible, namely one that stays with the trailer, is not hard to locate, and does not get in the way of mounting or using the trailer.

SUMMARY OF THE INVENTION

The present invention is a substantially spherical ball made of tough plastic that fits in the coupler cavity of a trailer and is secured to the trailer safety chain by a zip tie, cord or cable. It is locked in place by a padlock through the lever. Thus it prevents a potential thief from quickly temporarily hitching the trailer to their hitch ball and towing the trailer to a place where there will be no witnesses to the lock being cut off.

BRIEF DESCRIPTION OF THE DRAWINGS

FIG. 1 is a top view of the first embodiment of the present invention.

FIG. 2 is an oblique view of the first embodiment as seen from the top and side.

FIG. 3 is a left side view of the first embodiment.

FIG. 4 is a front view of the first embodiment.

FIG. 5 is a right side view of the first embodiment.

FIG. 6 is a bottom view of the first embodiment.

FIG. 7 is an oblique view of the first embodiment as seen from below one side.

DETAILED DESCRIPTION OF THE INVENTION

Figure 8:
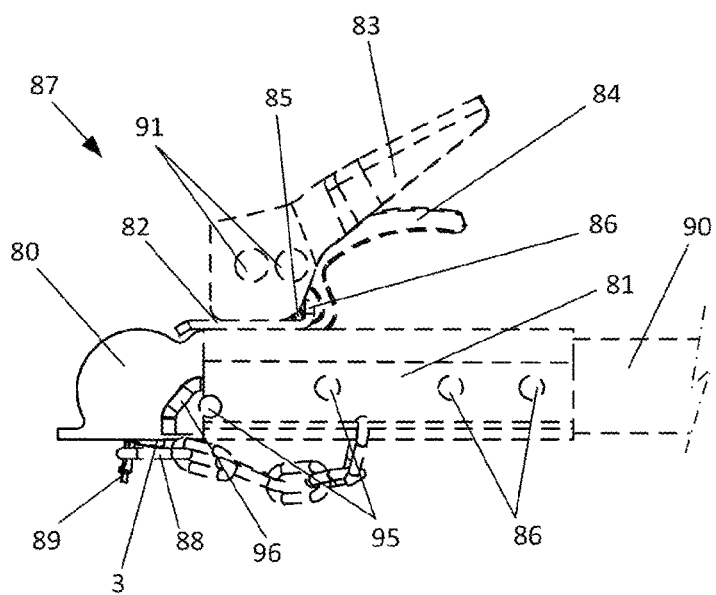
FIG. 8 is a side view of the first embodiment of the invention in a typical ball hitch coupler.

Referring now to the drawings, in which like reference characters refer to like elements among the drawings, FIG. 1 is a top view of the first embodiment of the present invention, a body of tough material, which consists of ball part 6, having a substantially round wall 2 and internal cavity 1, a bottom part 3, and wings 5. It is preferably made of tough plastic such as nylon or polycarbonate that resists cutting, drilling and grinding. This is important for reasons explained further below. The ball part 6 is substantially hollow to reduce weight and cost, although a ball that is solid throughout is within the scope of this invention. While it need not be solid through and through, the wall 2 must be thick enough to make penetration even with a drill nearly impossible. The necessary thickness can be determined without an undue amount of experimentation. The overall shape of the ball part 6 must be such as to occupy substantially the entire spherical interior of a trailer hitch coupler, as explained further below. Also shown are four wings 5 that extend upwardly from the bottom 3 and inwardly from the wall 2. It has been determined that four wings as shown are the optimum number, but a number of two or higher can be used provided the combination of number, thickness, and strength of the material is sufficient to prevent the invention from collapsing under the maximum projected downward force on the ball hitch coupler during a theft attempt. The wings 5 allow the invention to be molded and released from the mold easily, and they further reduce the volume of material needed to make the invention compared to the amount needed to make a ball with a wall extending farther upward. The center of the inside of the bottom 3 shows two tie holes 4 that go through the bottom 3, for purposes to be explained further below.

FIG. 2 is an oblique view of the first embodiment as seen from above one side. The wall 2 and the outside of the bottom 3 are better viewed here.

FIG. 3 is a left side view of the first embodiment, FIG. 4 is a front view of the first embodiment, and FIG. 5 is a right side view of the first embodiment, all identical due to symmetry.

FIG. 6 is a bottom view of the first embodiment showing the tie holes 4 in the bottom 3 of the invention.

FIG. 7 is an oblique view of the first embodiment as seen from below one side.

FIG. 8 is a side view of the first embodiment of the invention installed in a typical ball hitch coupler 87. The parts of the ball hitch coupler that are not part of any embodiment of the invention are shown here in dashed lines as environmental structure. The ball part of the first embodiment is inside the substantially spherical coupler portion 80. The spherical coupler portion 80, together with the first embodiment and a hitch ball (not visible in this view) comprise the second embodiment of the invention. The spherical coupler portion 80 is welded to the left end (in this view) of an elongate channel portion 81. Atop the channel portion 81 is a lever pad 82 upon which is seated the unlocking lever 83 in the locked position and a safety lever 84 also in the locked position. The bottom tab 85 of the safety lever 84 is engaged to a safety slot (not visible) in the upturned right end 86 of the lever pad 82. The safety lever 84 is typically spring loaded inside the unlocking lever 83 so that the bottom tab 85 automatically engages the safety slot when the unlocking lever 83 is down. This prevents the unlocking lever 83 from accidentally being raised without intentional squeezing of the safety lever 84 against the unlocking lever 83 when a user wants to raise the unlocking lever 83. When the locking lever 83 is down, as shown, a latch 96 extends fully to the left (in this view). Normally this prevents the ball hitch coupler 87 from lifting off of a hitch ball on a towing vehicle. Here, the substantially spherical ball part of the invention is held in place and prevented from dropping out. (Only a thin portion of its bottom 3 is visible here.)

Ball hitch couplers come in many models, but in the model of ball hitch coupler 87 depicted here, two lock hasp holes 95 are provided which extend all the way through the ball hitch coupler 87. These holes provide two alternative locations to insert a lock hasp (see FIG. 9) to enable locking the unlocking lever in the down position. A plurality of mounting holes 86 are provided through the channel portion 81 for mounting the hitch coupler 87 onto the front end of a trailer tongue 90. A portion of a safety chain 88 is visible here. A zip tie 89 attaches one link of the chain 88 to the bottom 3 of the invention. In a third embodiment of the invention, the zip tie or its equivalent is combined with the first embodiment. Circular bumps 91 in the wall of the unlocking lever 83 are shown here; they allow internal room inside the unlocking lever 83 for lever axles (not visible in this view).

Figure 9:
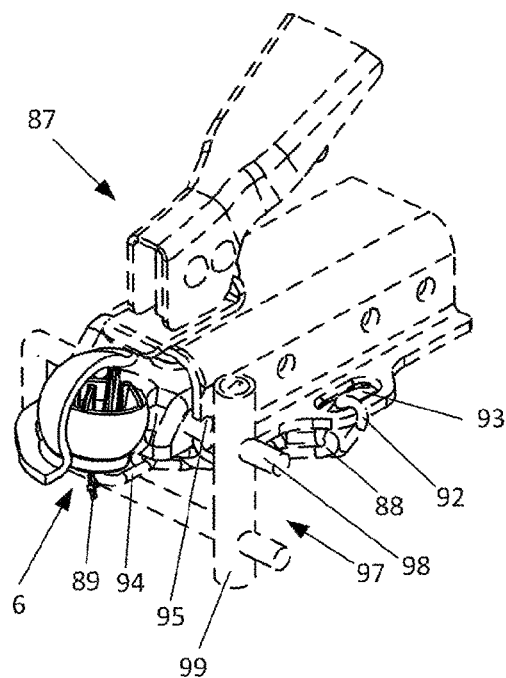
FIG. 9 is an oblique cutaway view of a typical ball hitch coupler showing the first and third embodiments of the invention.

FIG. 9 is an oblique cutaway view of a typical ball hitch coupler 87 showing the first and third embodiments of the invention. Ball part 6 of the first embodiment is shown inside the spherical coupler portion 80. The rightmost link 92 of the safety chain 88 is shown fastened to a slot 93 in the channel portion 81. The leftmost visible link 94 of the safety chain 88 is shown here connected to the zip tie 89, which, together with the first embodiment, comprise the third embodiment. Further links typically extend leftward to attach a hook in the chain to a part of the towing vehicle (not shown). Also shown here is a common type of key lock 97 comprising a U-shaped hasp 98 that passes through hasp hole 95 and back under the ball hitch coupler 87 and is secured by a bracket 99 containing a keyed cylinder.

Figure 10:
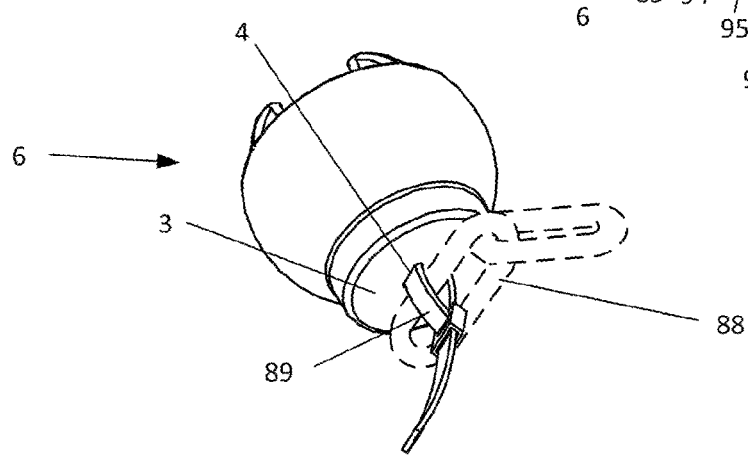
FIG. 10 is an oblique view from below one side of the second embodiment of the invention.

FIG. 10 is an oblique view of the third embodiment of the invention from below one side, comprising ball part 6 and bottom 3 with a zip tie 89 attached through holes 4 (only one hole visible) in the bottom 3. The zip tie 89 is used to fasten the bottom 3 to a link of the safety chain 88. The scope of this third embodiment of the invention includes ties equivalent to a zip tie, such as, for example and without limitation, a cord put through holes 4, or one or more elongate tie strands (not shown) molded into the bottom 3 of the invention. The safety chain 88 is shown here in dashed lines as environmental structure. Other chain links (not shown) attach the chain to another part of the trailer at one end and, typically, at the other end of the chain, to a hook which is fastened to the towing vehicle. Thus the invention becomes an unobtrusive part of the trailer and cannot be lost or get in the way.

Figure 11:
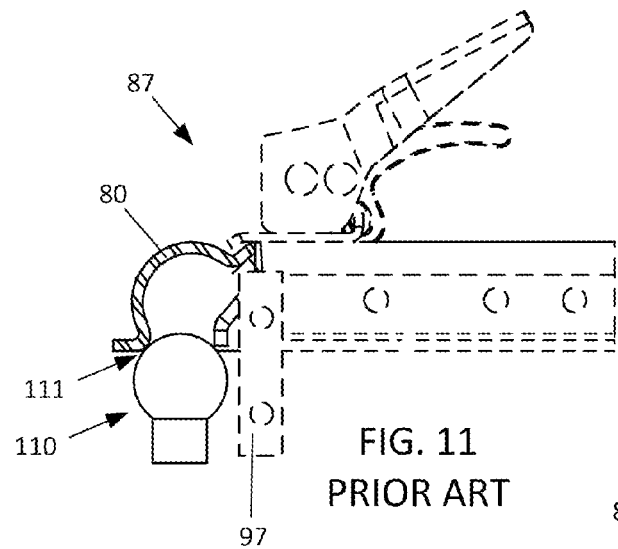
FIG. 11 is a side partial cutaway view of an empty prior art ball hitch coupler with the latches closed.

FIG. 11 is a side partial cutaway view of the ball hitch coupler 87 with the latches closed, showing how, in the prior art, ball-type couplers can still be pulled by a hitch ball 110 even when a lock 97 prevents the ball 110 from being fully inserted into the spherical coupler portion 80. This is possible because the weight of the trailer pushes the open end of the coupler portion 80 down hard enough on the ball 110 to give it sufficient purchase against the bottom edge 111 of the coupler portion 80 that it can pull the trailer to the left.

Figure 12:
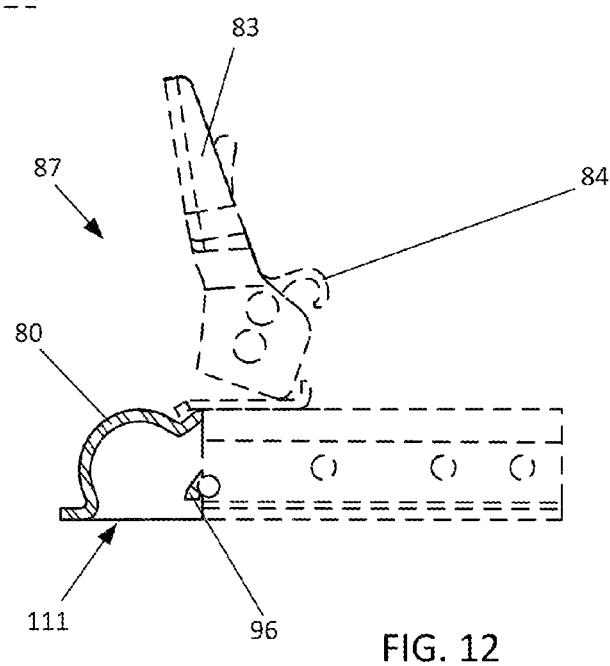
FIG. 12 is a side partial cutaway view of an empty prior art ball hitch coupler with the latches open.

FIG. 12 is a side partial cutaway view of the prior art ball hitch coupler 87 with the latches open, showing how unlatching of the safety lever 84 and the unlocking lever 83 and rotating them counterclockwise in this view moves the latch 96 to the right, increasing the open width of the bottom edge 111 so that a hitch ball (not shown) or the invention (not shown) can be inserted normally into the spherical coupler portion 80.

Figure 13:
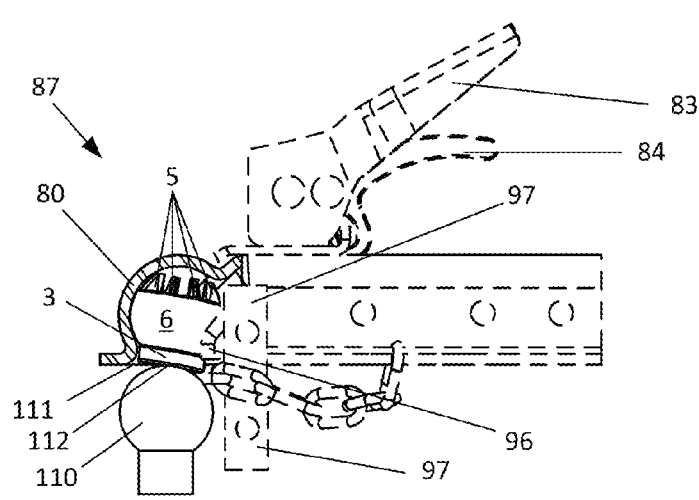
FIG. 13 is a side partial cutaway view of the ball hitch coupler with the first, second and third embodiments of the invention.

FIG. 13 is a side partial cutaway view of the ball hitch coupler with the first, second and third embodiments of the invention. Two of the parts of this second embodiment are the ball part 6 and the spherical coupler portion 80. They are locked together by the latch 96 pushed to the left again by rotation of the latches 83 and 84 to the down position, and by attachment of the lock 97 to the hitch ball coupler 87. The bottom 3, also part of this second embodiment, prevents the situation depicted in FIG. 11 by substantially filling all of the space between the ball part 6 and the bottom edge 111 (see FIGS. 11 and 12). The wings 5 on the ball part 6, also part of the second embodiment, occupy the upper space within the coupler portion 80 to prevent the invention from being squeezed so far up into the coupler portion 80 that the bottom 3 does not extend sufficiently far down to prevent the situation described in FIG. 11. A hitch ball 110 on a towing vehicle is also part of the second embodiment. In this figure, the bottom 3 is holding the top point 112 of the hitch ball 110 below the bottom edge 111, so that if the hitch ball 110 is pulled to the left, it will slip out from under the ball hitch coupler 87. The toughness of the ball part 6, the wings 5, and the bottom 3 makes it nearly impossible to cut, grind or drill them out, and more difficult to remove than the lock 97.

A first embodiment of a method of using the invention comprises the steps of: (a) raising the safety lever 84 and the unlocking lever 83 on the ball hitch coupler 87; (b) inserting the body of the first embodiment comprising ball part 6, bottom part 3, and wings 5, inside the coupler portion 80; (c) while holding the body inside the coupler portion 80, lowering the safety lever 84 and the unlocking lever 83; (d) placing a lock hasp 98 through an appropriate lock hasp hole 95 in the ball hitch coupler 87 and locking the lock 97; and (e) placing a zip tie 89 through the tie holes 4 in the bottom 3 as well as through one link of the chain 88, and zipping it to bind the bottom 3 of the ball part 6 to the chain 88. In a second method embodiment, the zip tie 89 may be placed through the tie holes 4 (creating the second embodiment of the device) and secured to the chain 88 before the ball part 6 is inserted into the coupler portion 80. If the zip tie 89 is replaced by one or more elongate tie strands molded into the bottom 3, step (e) above in the second embodiment of the method is replaced by tying one or more elongate tie strands through a link in the chain 88.

I claim:

1. A trailer theft deterrent device, comprising:
   a body of tough plastic material shaped to fit inside the spherical coupler portion of a ball hitch coupler;
   the body having a shape comprising an upper half and a lower half, the lower half having a bottom;
   the lower half of the shape being a hollow hemisphere or a solid hemisphere and having a wall;
   the upper half of the shape having a plurality of wings extending upwardly from the wall; and
   the body being so dimensioned that when the body is fitted inside the spherical coupler portion and the bottom is placed on top of a hitch ball, the top of the hitch ball is no higher than the lowest part of the spherical coupler portion.

2. The device of claim 1, wherein:
said body has at least one tie strand attached to it.

3. The device of claim 1, wherein:
said body comprises a means for attaching said at least one tie strand to said body.

4. The device of claim 3, wherein:
said means for attaching said at least one tie strand to said body comprises
two tie holes through said body.

5. The device of claim 4, wherein:
said two tie holes are molded through said bottom of said body; and
said at least one tie strand is threaded through said two tie holes.

6. The device of claim 5, wherein:
said at least one tie strand is a zip tie.

7. A method for deterring the theft of a hitch ball trailer using the device of claim 3, comprising the steps of:
   (a) opening said ball hitch coupler;
   (b) inserting said body into said hitch coupler portion;
   (c) while holding said body inside said hitch coupler portion, closing said ball hitch coupler;
   (d) placing the lock hasp of a lock through one of said at least one lock hasp hole in said ball hitch coupler and locking the lock; and
   (e) connecting said body to a chain with said at least one tie strand.

8. The method of claim 7, in which:
step (e) is performed before any other step.

* * * * *